(12) United States Patent
Yang

(10) Patent No.: US 11,586,903 B2
(45) Date of Patent: Feb. 21, 2023

(54) METHOD AND SYSTEM OF CONTROLLING COMPUTING OPERATIONS BASED ON EARLY-STOP IN DEEP NEURAL NETWORK

(71) Applicant: SAMSUNG ELECTRONICS CO., LTD., Suwon-si (KR)

(72) Inventor: Seung-Soo Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1173 days.

(21) Appl. No.: 16/025,546

(22) Filed: Jul. 2, 2018

(65) Prior Publication Data

US 2019/0114541 A1   Apr. 18, 2019

(30) Foreign Application Priority Data

Oct. 18, 2017   (KR) ......................... 10-2017-0135461

(51) Int. Cl.
*G06N 3/08* (2006.01)
*G06F 9/50* (2006.01)
*G06N 3/04* (2023.01)

(52) U.S. Cl.
CPC ............. *G06N 3/08* (2013.01); *G06F 9/5011* (2013.01); *G06N 3/04* (2013.01)

(58) Field of Classification Search
CPC .......... G06N 3/08; G06N 3/04; G06N 3/0481; G06N 3/0454; G06N 3/063; G06F 9/5011
See application file for complete search history.

(56) References Cited

U.S. PATENT DOCUMENTS 2,044,842 A   6/1936   Goldberg
2,243,474 A   5/1941   Bryce
(Continued)

FOREIGN PATENT DOCUMENTS

EP   0 370 654 B1   4/1995
EP   0 284 037 B1   12/1997
(Continued)

OTHER PUBLICATIONS

S. Teerapittayanon, B. McDanel and H. T. Kung, "BranchyNet: Fast inference via early exiting from deep neural networks," 2016 23rd International Conference on Pattern Recognition (ICPR), 2016, pp. 2464-2469, doi: 10.1109/ICPR.2016.7900006 (Year: 2016).*
(Continued)

*Primary Examiner* — Kamran Afshar
*Assistant Examiner* — Marshall L Werner
(74) *Attorney, Agent, or Firm* — Sughrue Mion, PLLC

(57) ABSTRACT

A method of controlling computing operations in a deep neural network (DNN) is provided. A network structure of the DNN including a plurality of layers is analyzed. A hyper parameter is set based on the network structure and real-time context information of a system configured to drive the DNN. The hyper parameter is used for performing an early-stop function. Depth-wise jobs are assigned to resources included in the system based on the hyper parameter to execute the depth-wise jobs. Each of the depth-wise jobs includes at least a part of the computing operations. When an early-stop event for a first layer among the layers is generated while the plurality of depth-wise jobs are executed, a subset computing operations included in at least one second layer are performed and a remainder of the computing operations are stopped. The at least one second layer is arranged prior to the first layer.

20 Claims, 7 Drawing Sheets

(56) References Cited

U.S. PATENT DOCUMENTS

| | | | |
|---|---|---|---|
| 3,363,331 A | 1/1968 | Hunt | |
| 3,434,115 A | 3/1969 | Chomicki | |
| 3,753,234 A | 8/1973 | Gilbert et al. | |
| 4,613,941 A | 9/1986 | Smith et al. | |
| 4,827,462 A | 5/1989 | Flannagan et al. | |
| 4,930,102 A | 5/1990 | Jennings | |
| 4,980,828 A | 12/1990 | Kapcio et al. | |
| 5,163,129 A | 11/1992 | Donato et al. | |
| 5,249,061 A | 9/1993 | Nagashima et al. | |
| 5,353,061 A | 10/1994 | Rodriguez et al. | |
| 5,568,606 A | 10/1996 | Dobbek | |
| 5,761,501 A | 6/1998 | Lubbers et al. | |
| 5,848,423 A | 12/1998 | Ebrahim et al. | |
| 5,986,677 A | 11/1999 | Jones et al. | |
| 6,052,199 A | 4/2000 | Honda | |
| 6,141,380 A | 10/2000 | Krishnamurthy et al. | |
| 6,324,631 B1 | 11/2001 | Kuiper | |
| 6,496,943 B1 | 12/2002 | Belser et al. | |
| 6,529,913 B1 | 3/2003 | Doig et al. | |
| 6,542,584 B1 | 4/2003 | Sherwood et al. | |
| 6,697,968 B1 | 2/2004 | Orfali | |
| 6,704,692 B1 | 3/2004 | Banerjee et al. | |
| 6,735,723 B2 | 5/2004 | Park et al. | |
| 6,909,384 B2 | 6/2005 | Baldwin et al. | |
| 6,970,640 B2 | 11/2005 | Green et al. | |
| 6,990,150 B2 | 1/2006 | Fang | |
| 7,026,964 B2 | 4/2006 | Baldwin et al. | |
| 7,039,834 B1 | 5/2006 | Orfali | |
| 7,111,084 B2 | 9/2006 | Tan et al. | |
| 7,345,794 B2 | 3/2008 | Matsui | |
| 7,979,844 B2 | 7/2011 | Srinivasan | |
| 8,250,442 B2 | 8/2012 | Ueda et al. | |
| 8,285,965 B2 | 10/2012 | Karr et al. | |
| 8,527,276 B1 | 9/2013 | Senior et al. | |
| 8,705,550 B2 | 4/2014 | Shah et al. | |
| 8,738,845 B2 | 5/2014 | Patel et al. | |
| 8,745,353 B2 | 6/2014 | Feldman et al. | |
| 8,819,522 B2 | 8/2014 | Baba | |
| 8,832,396 B2 | 9/2014 | Ohara et al. | |
| 9,264,380 B2 | 2/2016 | Hass | |
| 9,516,379 B2 | 12/2016 | Chen et al. | |
| 10,108,902 B1 * | 10/2018 | Lockett | G06N 3/0445 |
| 2001/0048567 A1 | 12/2001 | Chng et al. | |
| 2004/0070616 A1 | 4/2004 | Hildebrandt et al. | |
| 2007/0083467 A1 | 4/2007 | Lindahl et al. | |
| 2007/0206682 A1 | 9/2007 | Hamilton et al. | |
| 2009/0135309 A1 | 5/2009 | DeGeorge et al. | |
| 2009/0157205 A1 | 6/2009 | Inoue et al. | |
| 2012/0002022 A1 | 1/2012 | Ohgose et al. | |
| 2014/0297988 A1 | 10/2014 | Ohyama et al. | |
| 2015/0363688 A1 | 12/2015 | Gao et al. | |
| 2016/0328643 A1 | 11/2016 | Liu et al. | |
| 2016/0328645 A1 | 11/2016 | Lin et al. | |
| 2017/0011281 A1 | 1/2017 | Dijkman et al. | |
| 2017/0017857 A1 | 1/2017 | Wolf et al. | |
| 2017/0024642 A1 | 1/2017 | Xiong et al. | |
| 2017/0228639 A1 * | 8/2017 | Hara | G06N 7/005 |
| 2018/0053091 A1 * | 2/2018 | Savvides | G06N 3/04 |

FOREIGN PATENT DOCUMENTS

| | | | |
|---|---|---|---|
| EP | 1 024 490 B1 | 4/2003 | |
| EP | 1 924 091 A1 | 5/2008 | |
| JP | 2-151471 A | 6/1990 | |
| JP | 5-212912 A | 8/1993 | |
| JP | 2011-237934 A | 11/2011 | |
| WO | WO-2015083199 A1 * | 6/2015 | G06K 9/00986 |

OTHER PUBLICATIONS

Teerapittayanon et al., BranchyNet: Fast Inference via Early Exiting from Deep Neural Networks, Sep. 2017. (Year: 2017).*

Communication dated Jul. 27, 2022 by the Korean Intellectual Property Office in counterpart Korean English Patent Application No. 10-2017-0135461 translation.

* cited by examiner

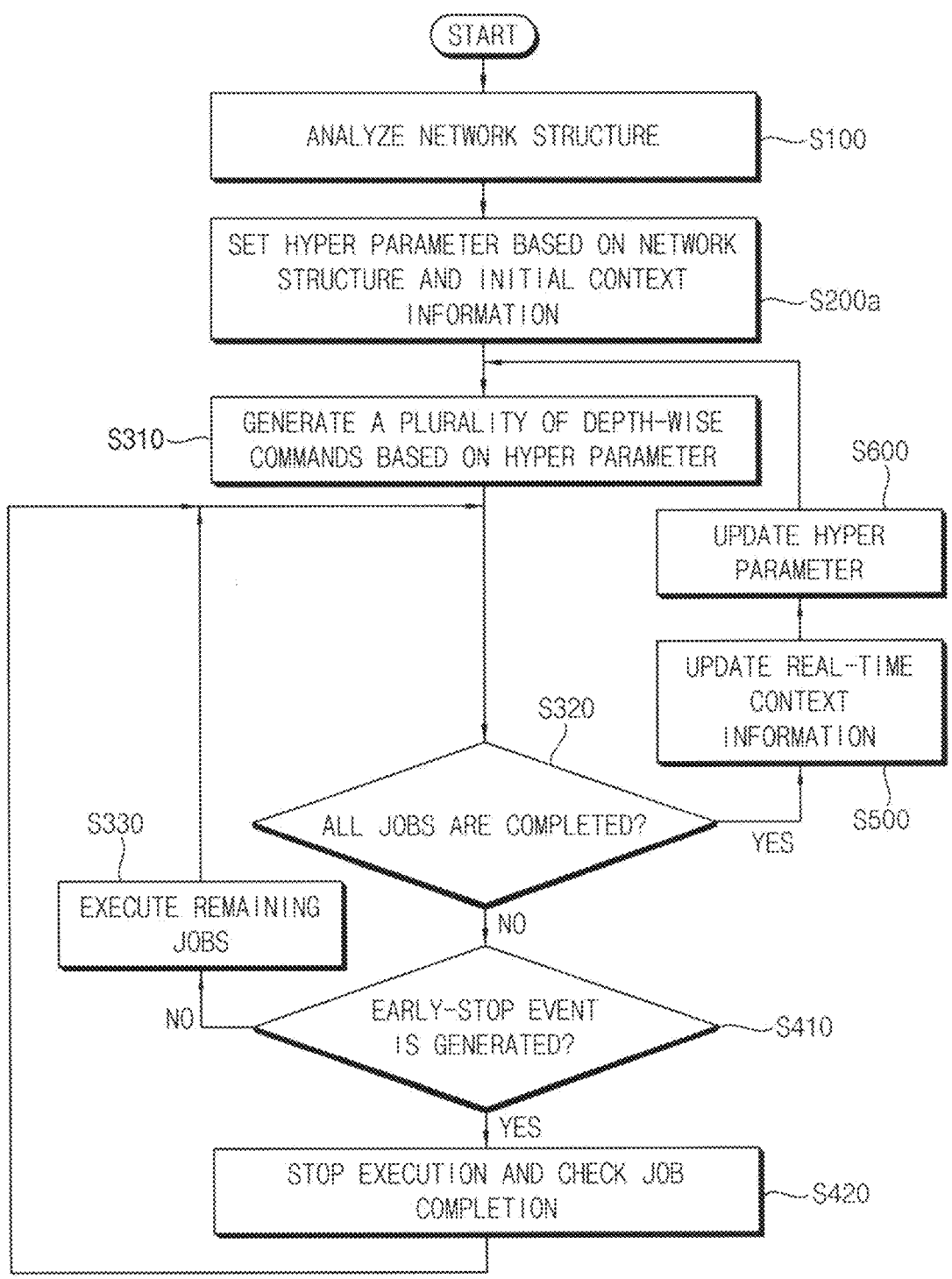

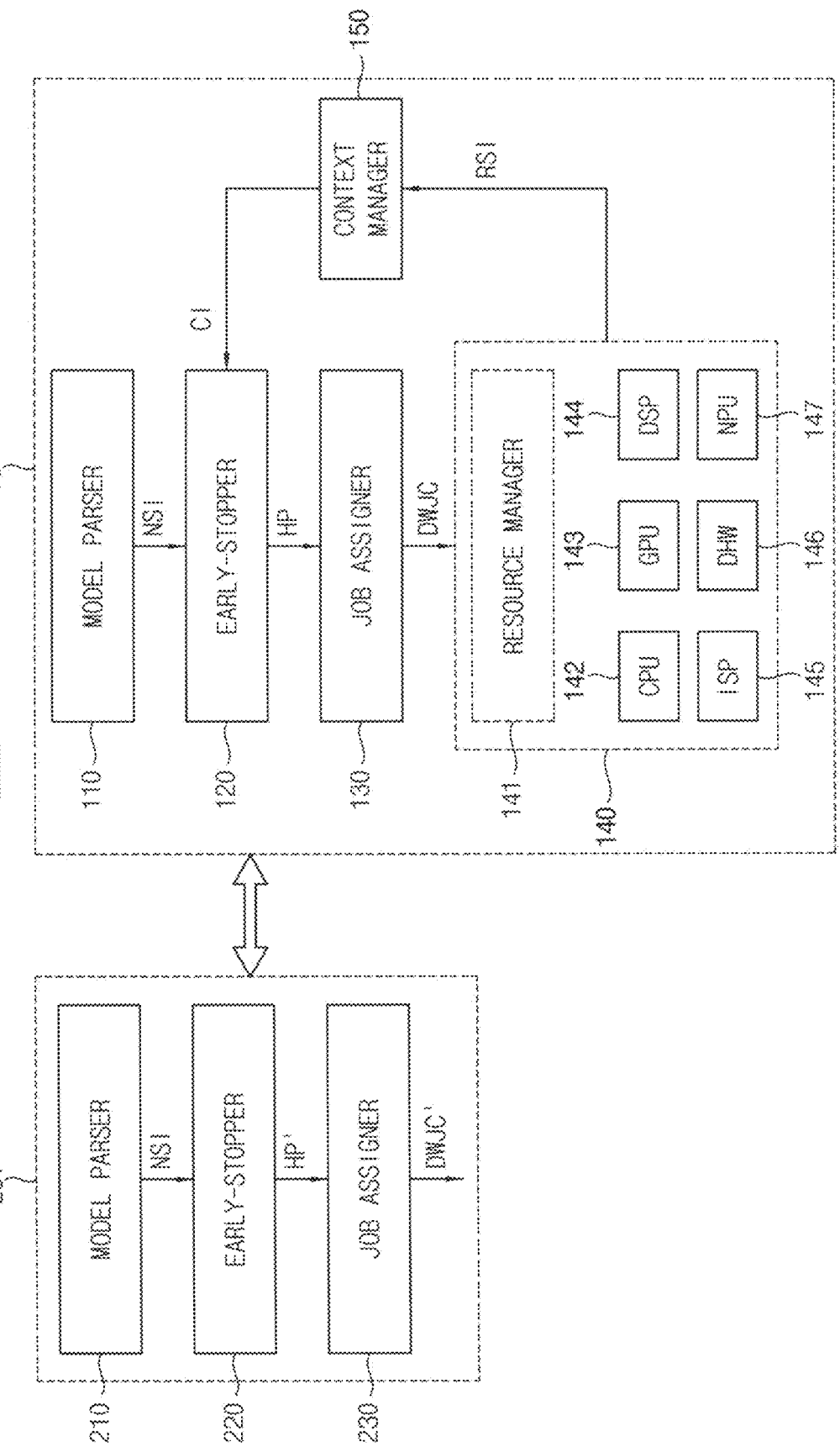

METHOD AND SYSTEM OF CONTROLLING COMPUTING OPERATIONS BASED ON EARLY-STOP IN DEEP NEURAL NETWORK

CROSS-REFERENCE TO RELATED APPLICATION

This application claims priority from Korean Patent Application No. 10-2017-0135461, filed on Oct. 18, 2017 in the Korean Intellectual Property Office (KIPO), the disclosure of which is incorporated herein by reference in its entirety.

BACKGROUND

1. Technical Field

Example embodiments relate generally to artificial neural networks, and more particularly to methods of controlling a plurality of computing operations based on early-stop in deep neural network and systems of performing these methods.

2. Description of the Related Art

An artificial neural network (ANN) is obtained by engineering a cell structure model of a human brain where a process of efficiently recognizing a pattern is performed. The ANN refers to a calculation model that is based on software or hardware and is designed to imitate biological calculation abilities by applying many artificial neurons interconnected through connection lines. The human brain consists of neurons that are basic units of a nerve, and encrypts or decrypts information according to different types of dense connections between these neurons. Artificial neurons in the ANN are obtained through simplification of biological neuron functionality. A deep neural network (DNN) is a type of the ANN and has relatively complex layers and depths. The ANN and the DNN perform a cognition or learning process by interconnecting the artificial neurons having connection intensities. Accordingly, deep learning processes and services may be performed based on the ANN and the DNN.

SUMMARY

At least one example embodiment of the present disclosure provides a method of efficiently controlling a plurality of computing operations based on early-stop in a deep neural network.

At least one example embodiment of the present disclosure provides a system of controlling a plurality of computing operations in a deep neural network.

According to an aspect of an example embodiment, in a method of controlling a plurality of computing operations in a deep neural network (DNN), a network structure of the DNN may be analyzed, the network structure including a plurality of layers. A hyper parameter may be set based on the network structure and real-time context information of a system configured to drive the DNN. The hyper parameter may be used for performing an early-stop function. A plurality of depth-wise jobs may be assigned to a plurality of resources included in the system based on the hyper parameter to execute the plurality of depth-wise jobs. Each of the plurality of depth-wise jobs may include at least a part of the plurality of computing operations. When an early-stop event for a first layer among the plurality of layers is generated while the plurality of depth-wise jobs are executed, a subset of a plurality of computing operations included in at least one second layer may be performed and a remainder of the plurality of computing operations may be stopped. The at least one second layer may be arranged prior to the first layer.

According to an aspect of an example embodiment, a system of controlling a plurality of computing operations in a deep neural network (DNN) may include a first model parser, a first early-stopper, a first job assigner and a plurality of resources. The first model parser may analyze a network structure of the DNN including a plurality of layers. The first early-stopper may set a hyper parameter based on the network structure and real-time context information of the system configured to drive the DNN. The hyper parameter may be used for performing an early-stop function. The first job assigner may assign a plurality of depth-wise jobs based on the hyper parameter. Each of the plurality of depth-wise jobs may include at least a part of the plurality of computing operations. The plurality of resources may execute the plurality of depth-wise jobs. When an early-stop event for a first layer among the plurality of layers is generated while the plurality of depth-wise jobs are executed, the plurality of resources may perform a subset of a plurality of computing operations included in at least one second layer and stop a remainder of the plurality of computing operations. The at least one second layer may arranged prior to the first layer.

In the method and the system of controlling the plurality of computing operations in the DNN according to example embodiments, computing operations for a specific layer (e.g., a convolutional layer) arranged prior to a pooling layer may be stopped or skipped in advance, and thus the accuracy may be maintained, the total amount of the computing operations may be reduced, and various indicators (e.g., the performance, power consumption, Memory footprint, memory bandwidth, etc.) related to the system may be enhanced. In addition, the early-stop function may be set using the hyper parameter, and reasonable target accuracy and latency may be set, and the trade-off between accuracy and cost may be adjusted based on the requirements of application, the capacity of hardware, the context-awareness, etc. Accordingly, the DNN may be optimized based on the method and system according to example embodiments.

BRIEF DESCRIPTION OF THE DRAWINGS

The above and/or other aspects will be more clearly understood from the following detailed description taken in conjunction with the accompanying drawings in which:

FIG. 5 is a flow chart illustrating the method of controlling the plurality of computing operations in the DNN in detail;

FIG. 7 is a block diagram illustrating a system of controlling a plurality of computing operations in the DNN according to an example embodiment.

DETAILED DESCRIPTION

Figure 1:
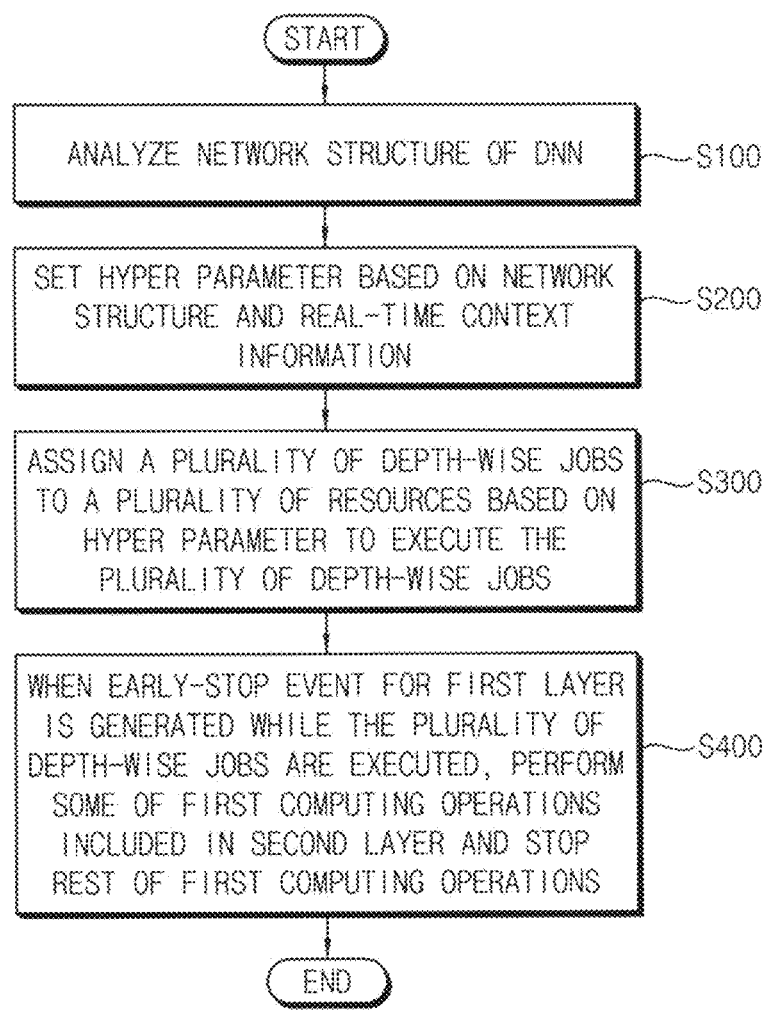
FIG. 1 is a flow chart illustrating a method of controlling a plurality of computing operations in a deep neural network (DNN) according to an example embodiment.

Various example embodiments will be described more fully with reference to the accompanying drawings, in which embodiments are shown. The present disclosure may, however, be embodied in many different forms and should not be construed as limited to the example embodiments set forth herein. Like reference numerals refer to like elements throughout this application.

FIG. 1 is a flow chart illustrating a method of controlling a plurality of computing operations in a deep neural network (DNN) according to an example embodiment.

Referring to FIG. 1, in a method of controlling a plurality of computing operations in a DNN, a network structure of the DNN is analyzed (step S100). The DNN includes a plurality of layers. The network structure of the DNN will be described in detail with reference to FIGS. 2 and 3.

A hyper parameter is set based on the network structure and real-time context information (step S200). The DNN is configured to be driven by a system (e.g., a system 100 of FIG. 4) that includes a plurality of resources, and the real-time context information represents an operating status of the system, requirements of the system, performance of the system, or the like. The hyper parameter is used for performing an early-stop function in which computing operations (or simply computings), computations or calculations for a previous layer arranged prior to a specific layer (e.g., a first layer in step S400) is early-stopped or stopped in advance (e.g., stopped prematurely or sooner than originally anticipated), thereby reducing the amount of computing operations, computations or calculations.

A plurality of depth-wise jobs are assigned to the plurality of resources included in the system based on the hyper parameter to execute the plurality of depth-wise jobs (step S300). Each of the plurality of depth-wise jobs includes at least a part of the plurality of computing operations. Step S300 may represent a process in which the DNN is actually driven by the system. The plurality of depth-wise jobs and the plurality of computing operations will be described in detail with reference to FIGS. 2 and 3.

When an early-stop event for a first layer among the plurality of layers in the DNN is generated while the plurality of depth-wise jobs are executed, a subset of a plurality of first computing operations included in at least one second layer are performed and the remainder of the plurality of first computing operations other than the subset of the plurality of first computing operations are stopped (step S400). The at least one second layer is arranged prior to the first layer. In other words, computing operations for the second layer prior to the first layer may be stopped or ceased before (or earlier than that) all of the first computing operations are completed, and thus the total amount of the computing operations for the system may be reduced.

In some example embodiments, the first layer may be a pooling layer in which input data is sampled (e.g., down-sampled, sub-sampled, down-sized or re-sized) to generate output data smaller in size than the input data. As will be described with reference to FIGS. 6A and 6B, the pooling layer may include a maximum pooling layer (or a max pooling layer) for selecting a maximum value and an average pooling layer (or a mean pooling layer) for obtaining an average value.

Figure 2:
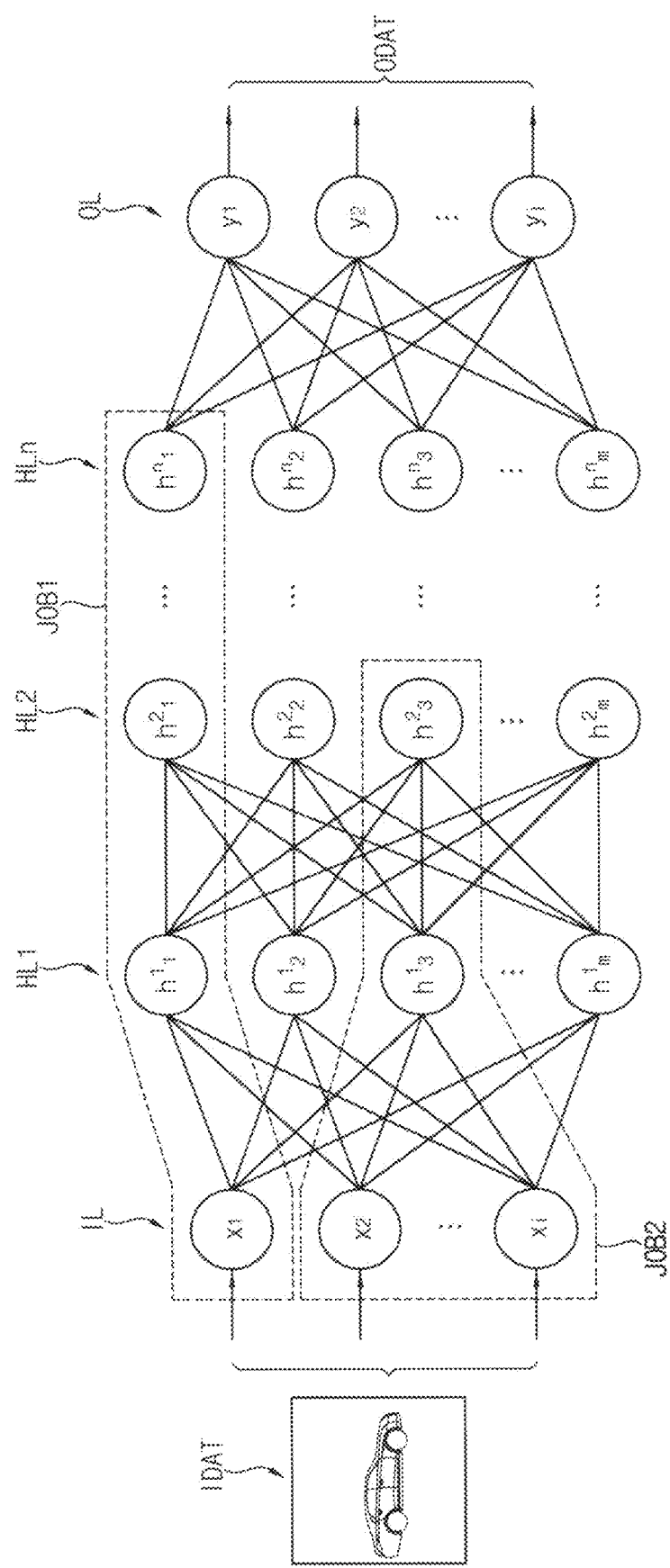
FIGS. 2 and 3 are diagrams for describing a network structure of the DNN according to an example embodiment
Figure 3:
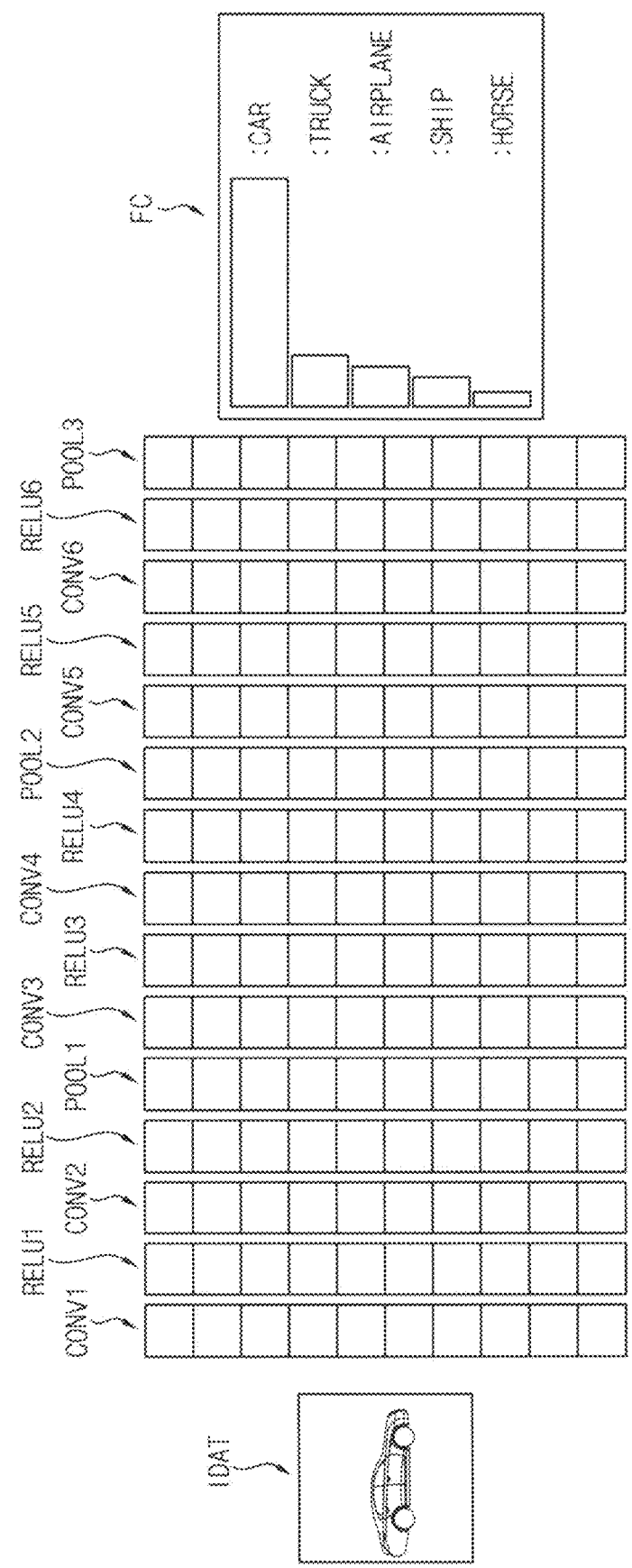

FIGS. 2 and 3 are diagrams for describing a network structure of the DNN according to an example embodiment.

Referring to FIG. 2, a general neural network may include an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) IDAT whose length is i may be input to the input nodes $x_1$, $x_2$, . . . , $x_i$ such that each element of the input data IDAT is input to a respective one of the input nodes $x_1$, $x_2$, . . . , $x_i$.

The plurality of hidden layers HL1, HL2, . . . , HLn may include a plurality of hidden nodes $h^1_1$, $h^1_2$, $h^1_3$, . . . , $h^1_m$, $h^2_1$, $h^2_2$, $h^2_3$, . . . , $h^2_m$, $h''_1$, $h''_2$, $h''_3$, . . . , $h''_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h''_1$, $h''_2$, $h''_3$, . . . , $h''_m$, where m is a natural number.

The output layer OL may include j output nodes $y_1$, $y_2$, . . . , $y_j$, where j is a natural number. Each of the output nodes $y_1$, $y_2$, . . . , $y_j$ may correspond to a respective one of classes to be categorized. The output layer OL may output output values (e.g., class scores or simply scores) associated with the input data IDAT for each of the classes. The output layer OL may be referred to as a fully-connected layer and may represent, for example, a probability that the input data IDAT corresponds to a car.

A structure of the neural network illustrated in FIG. 2 may be represented by information on branches (or connections) between nodes illustrated as lines, and a weighted value assigned to each branch, which is not illustrated. Nodes within one layer may not be connected to one another, but nodes of different layers may be fully or partially connected to one another.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

Generally, the structure of the neural network is set in advance, and the weighted values for the connections between the nodes are set appropriately using data having an already known answer of which class the data belongs to. The data with the already known answer is referred to as "training data," and a process of determining the weighted value is referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

In a process or operation in which the neural network is driven, a layer-wise job represents a job that is assigned in units of layer. For example, in the layer-wise job, all of computing operations for one layer (e.g., the layer HL1) may be performed, and all of computing operations for another layer (e.g., the layer HL2) may be performed after all of the computing operations for the one layer are completed. To prevent the waste of resources in the layer-wise job, some computing operations for some nodes (e.g., the nodes $x_1$, $h^1_1$, $h^2_1$, $h''_1$) included in several layers may be assigned to one job JOB1, and other computing operations for other nodes (e.g., the nodes $x_2$, . . . , $x_i$, $h^1_3$, $h^2_3$) included in several layers may be assigned to another job JOB2, thereby improving performance and efficiency of the neural network.

The general neural network illustrated in FIG. 2 may not be suitable for handling input image data (or input sound data) because each node (e.g., the node $h^1_1$) is connected to all nodes of a previous layer (e.g., the nodes $x_1$, $x_2$, . . . , $x_i$ included in the layer IL) and then the number of weighted values drastically increases as the size of the input image data increases. Thus, a convolutional neural network, which is implemented by combining the filtering technique with the general neural network, has been researched such that two-dimensional image (e.g., the input image data) is efficiently trained by the convolutional neural network.

Referring to FIG. 3, a convolutional neural network may include a plurality of layers CONV1, RELU1, CONV2, RELU2, POOL1, CONV3, RELU3, CONV4, RELU4, POOL2, CONV5, RELU5, CONV6, RELU6, POOLS and FC.

Unlike the general neural network, each layer of the convolutional neural network may have three dimensions of width, height and depth, and thus data that is input to each layer may be volume data having three dimensions of width, height and depth. For example, if an input image in FIG. 3 has a size of 32 widths (e.g., 32 pixels) and 32 heights and three color channels R, G and B, input data IDAT corresponding to the input image may have a size of 32*32*3. The input data IDAT in FIG. 3 may be referred to as input volume data or input activation volume.

As used herein, the term "depth" refers to a third dimension of one layer, one volume data or one activation volume, and corresponds to the number of channels included in one layer. Note that the term "depth" does not refer to a depth of the full convolutional neural network, which can refer to the total number of layers in the convolutional neural network.

Each of convolutional layers CONV1, CONV2, CONV3, CONV4, CONV5 and CONV6 may perform a convolutional operation on input volume data. In an image processing, the convolutional operation represents an operation in which image data is processed based on a mask with weighted values and an output value is obtained by multiplying input values by the weighted values and adding up the total multiplied values. The mask may be referred to as a filter, window or kernel.

Particularly, parameters of each convolutional layer may consist of a set of learnable filters. Every filter may be small spatially (along width and height), but may extend through the full depth of an input volume. For example, during the forward pass, each filter may be slid (more precisely, convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32*32*3 passes through the convolutional layer CONV1 having four filters with zero-padding, output volume data of the convolutional layer CONV1 may have a size of 32*32*12 (e.g., a depth of volume data increases).

Each of RELU layers RELU1, RELU2, RELU3, RELU4, RELU5 and RELU6 may perform a rectified linear unit operation that corresponds to an activation function defined by, e.g., a function $f(x)=\max(0, x)$ (e.g., an output is zero for all negative input x). For example, if input volume data having a size of 32*32*12 passes through the RELU layer RELU1 to perform the rectified linear unit operation, output volume data of the RELU layer RELU1 may have a size of 32*32*12 (e.g., a size of volume data is maintained).

Each of pooling layers POOL1, POOL2 and POOLS may perform a down-sampling operation on input volume data along spatial dimensions of width and height. For example, four input values arranged in a 2*2 matrix formation may be converted into one output value based on a 2*2 filter. For example, a maximum value of four input values arranged in a 2*2 matrix formation may be selected based on 2*2 maximum pooling, or an average value of four input values arranged in a 2*2 matrix formation may be obtained based on 2*2 average pooling. For example, if input volume data having a size of 32*32*12 passes through the pooling layer POOL1 having a 2*2 filter, output volume data of the pooling layer POOL1 may have a size of 16*16*12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing a spatial size of image and extracting a characteristic of image.

An output layer or a fully-connected layer FC may output results (e.g., class scores) of the input volume data IDAT for each of the classes. For example, the input volume data IDAT corresponding to the two-dimensional image may be converted into an one-dimensional matrix or vector as the convolutional operation and the down-sampling operation are repeated. For example, the fully-connected layer FC may represent probabilities that the input volume data IDAT corresponds to a car, a truck, an airplane, a ship and a horse.

Although FIG. 3 illustrates an example where the convolutional neural network includes six convolutional layers CONV1, CONV2, CONV3, CONV4, CONV5 and CONV6, six RELU layers RELU1, RELU2, RELU3, RELU4, RELU5 and RELU6, three pooling layers POOL1, POOL2 and POOL3 and one fully-connected layer FC, the types and number of layers included in the convolutional neural network may not be limited thereto and may be changed according to example embodiments. In addition, the convolutional neural network may further include other layers such as a softmax layer for converting score values corresponding to predicted results into probability values, a bias adding layer for adding at least one bias, or the like.

The term "DNN" used herein may represent a neural network that is implemented based on the convolutional neural network illustrated in FIG. 3 and has relatively complex layers and depths.

In addition, the term "depth-wise job" used herein may include both a concept of assigning some computing operations for some nodes (e.g., the nodes $x_1$, $h^1_1$, $h^2_1$, $h''_1$) included in several layers to one job JOB1 that is described with reference to FIG. 2 and a concept of processing volume data having depth (e.g., each layer and each volume data processed by each layer have three dimensions of width, height and depth) that is described with reference to FIG. 3.

Figure 4:
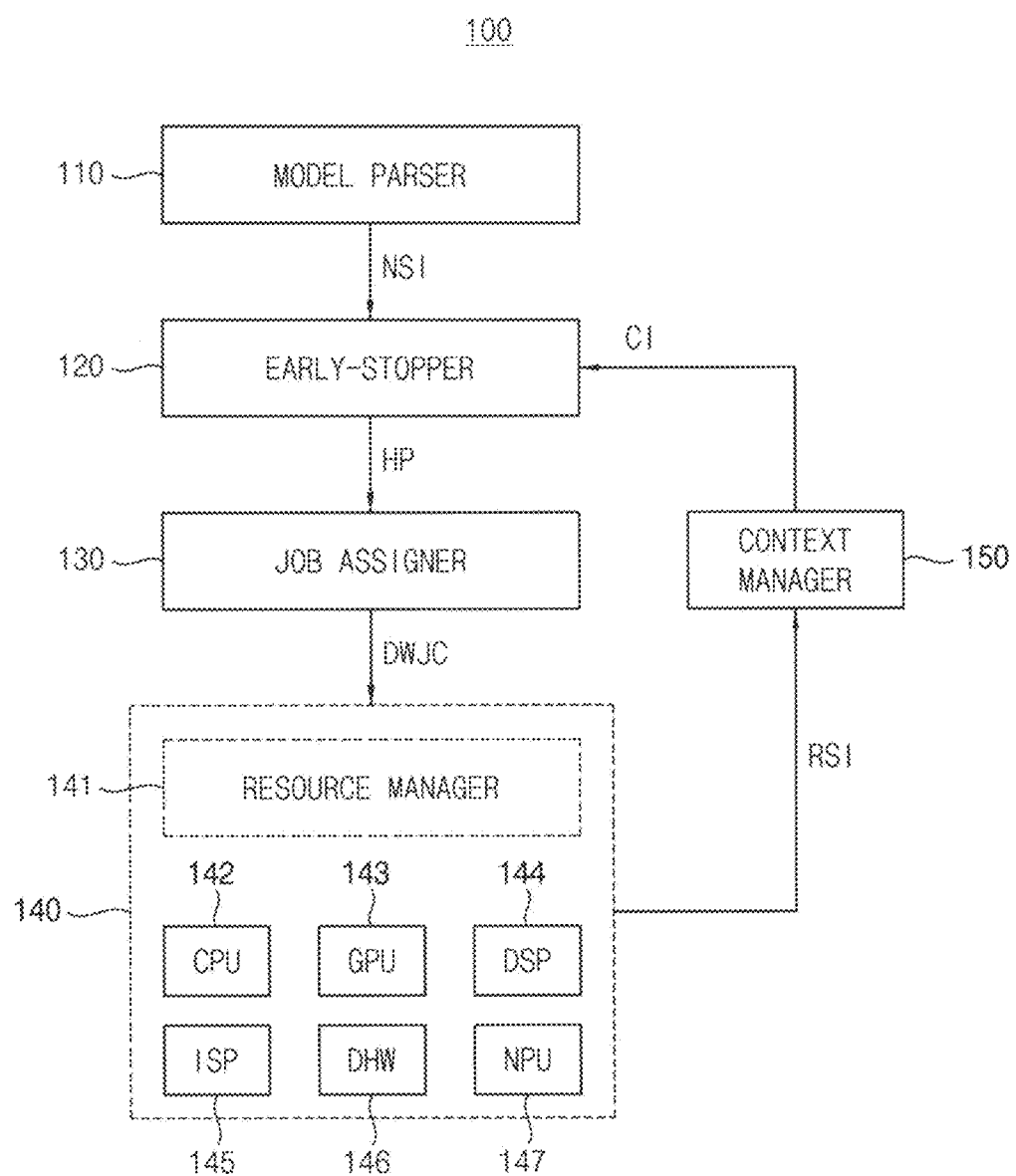
FIG. 4 is a block diagram illustrating a system of controlling a plurality of computing operations in the DNN according to an example embodiment.

FIG. 4 is a block diagram illustrating a system of controlling a plurality of computing operations in the DNN according to an example embodiment.

Referring to FIG. 4, a system 100 of controlling a plurality of computing operations in the DNN includes a model parser 110, an early-stopper 120, a job assigner 130 and a plurality of resources 142, 143, 144, 145, 146 and 147. The system 100 may further include a resource manager 141 and a context manager 150. Each of the components shown in FIG. 4 and other figures may be implemented with software (e.g., instructions, commands, code, etc.), hardware (e.g., circuits, microchips, processors, etc.), or a combination of both.

The model parser 110 analyzes a network structure NSI of the DNN including a plurality of layers. For example, the network structure NSI may include specifications and requirements of the DNN (e.g., latency or power), etc. For example, the specifications and requirements of the DNN may include, e.g., layer topology (e.g., depth or branch), network compression scheme (e.g., pruning), types of computing operation for each layer (e.g., BLAS, CONV, pooling or RELU), data property (e.g., format, security, size, types of input source/channel, physical location or virtual location), memory layout for operands of input, kernel/filter and output (e.g., padding, stride or data dimensional property), data compression scheme (e.g., quantization, Lempel Ziv (LZ) or Huffman), etc.

The early-stopper 120 sets a hyper parameter HP based on the network structure NSI and real-time context information CI. The hyper parameter HP is used for performing an early-stop function. For example, the early-stopper 120 may set an initial value of the hyper parameter HP based on the network structure NSI and an initial value of the real-time context information CI, and may update the hyper parameter HP in real-time or during runtime based on the real-time context information CI that is updated in real-time or during runtime according to an operating of the DNN.

The job assigner 130 assigns a plurality of depth-wise jobs based on the hyper parameter HP. Each of the plurality of depth-wise jobs includes at least a part of the plurality of computing operations. For example, the job assigner 130 may generate a plurality of depth-wise commands DWJC for the plurality of depth-wise jobs based on the hyper parameter HP, and the plurality of depth-wise jobs may be assigned to the plurality of resources 142, 143, 144, 145, 146 and 147 based on the plurality of depth-wise commands DWJC. For example, the plurality of depth-wise jobs may be assigned based on a capacity of hardware (e.g., each resource).

The plurality of resources 142, 143, 144, 145, 146 and 147 execute the plurality of depth-wise jobs based on the plurality of depth-wise commands DWJC. When an early-stop event for a first layer among the plurality of layers is generated while the plurality of depth-wise jobs are executed, the plurality of resources 142, 143, 144, 145, 146 and 147 perform a subset of a plurality of first computing operations included in at least one second layer and stop the remainder of the plurality of first computing operations other than the subset of the plurality of first computing operations based on the hyper parameter HP. The at least one second layer is arranged prior to the first layer. The early-stop function will be described in detail with reference to FIGS. 5, 6A and 6B.

In some example embodiments, the plurality of resources 142, 143, 144, 145, 146 and 147 may be computing resources that perform various computational functions such as particular calculations and tasks. In addition, the plurality of resources 142, 143, 144, 145, 146 and 147 may be a plurality of homogeneous or heterogeneous resources. For example, the plurality of resources 142, 143, 144, 145, 146 and 147 may include one or more of a central processing unit (CPU) 142, a graphics processing unit (GPU) 143, a digital signal processor (DSP) 144, an image signal processor (ISP) 145, dedicated hardware (DHW) 146 and a neural processing unit (NPU) 147. For example, the dedicated hardware 146 may include a vision processing unit (VPU), a virtual image processor (VIP), etc.

The resource manager 141 may generate resource status information RSI that represents performance and utilization of the plurality of resources 142, 143, 144, 145, 146 and 147, and may provide the resource status information RSI to the context manager 150. For example, the resource status information RSI may include, e.g., preference information of each resource (e.g., operation (CONV, RELU, etc.), kernel structure (3*3, 5*5, etc.), data flow (weight, output, input stationary), data reuse (filter, input), data layout, etc.), capacity of each resource (e.g., power, performance, arithmetic algorithm, implementation, etc.), limitation of each resource (e.g., unsupported data type and data layout, compression or quantization algorithm, etc.), etc.

The resource manager 141 and the plurality of resources 142, 143, 144, 145, 146 and 147 may form a resource block 140.

In some example embodiments, the resource manager 141 may be omitted, and the resource status information RSI may be directly collected from the plurality of resources 142, 143, 144, 145, 146 and 147.

The context manager 150 may update the real-time context information CI based on an operating status of the system 100. For example, the real-time context information CI may include performance (e.g., latency) and utilization of the plurality of resources 142, 143, 144, 145, 146 and 147, accuracy of the plurality of depth-wise jobs, power status of the system 100, etc.

For example, the context manager 150 may check a runtime or online status of the DNN that includes, e.g., execution (or computing) related information and state, dynamic loss and tolerance of accuracy/performance, application ID (identification), lifecycle of application, process, thread, activity, etc. The context manager 150 may check a hardware resource related information that includes, e.g., static loss and tolerance of accuracy/performance, changes of computing resource state, power/thermal aware, memory/storage status, etc.

In some example embodiments, the elements 110, 120, 130, 140, 141, 142, 143, 144, 145, 146, 147 and 150 in the system 100 may be included in a first electronic device with a built-in DNN (e.g., an electronic device in which the DNN is embedded). The first electronic device may be an electronic device that directly performs a user experience (e.g., that is directly controlled by a user). For example, the first electronic device may be any computing device and/or mobile device, such as a personal computer (PC), a laptop computer, a mobile phone, a smart phone, a tablet computer, a personal digital assistant (PDA), a portable multimedia player (PMP), a digital camera, a camcorder, a digital music player, a digital video player, a gaming console, a portable gaming console, a navigation device, a wearable device, a virtual reality (VR) device, an augmented reality (AR) device, etc.

In some example embodiments, at least a part of the elements 110, 120, 130, 140, 141, 142, 143, 144, 145, 146, 147 and 150 in the system 100 may be included in a second electronic device that is different from the first electronic device. The first electronic device may be referred to as a local device, and the second electronic device 200 may be referred to as a remote device. The second electronic device may be physically separated from the first electronic device, and may be interoperable with the first electronic device. For example, the second electronic device may be a companion chip or an off-chip such as a parallel processing element (PE), etc. For example, the second electronic device may be a companion device that depends on the first electronic device such as a wearable device (e.g., a smart watch). Alternatively, the second electronic device may be a local server (e.g., a home gateway) that controls an internet of things (IoT) device and/or an internet of everything (IoE) device, or an remote server (e.g., a cloud server).

Although not illustrated in FIG. 4, the plurality of resources may further include a microprocessor, an application processor (AP), customized hardware, compression hardware, etc. In addition, the system 100 may further include a memory and a plurality of communication resources that includes, e.g., a direct access memory (DMA), a connectivity, a memory copy capable resource, etc. For example, the DMA may include a memory DMA (MDMA), a peripheral DMA (PDMA), a remote DMA (RDMA), a smart DMA (SDMA), etc. The connectivity may perform wire/wireless communication with an internal element and/or an external device. For example, the connectivity may include an internal bus that supports an internal communication such as a system bus, peripheral component interconnect (PCI), PCI express (PCIe), etc., and/or may support an external communication such as a mobile telecommunication, Universal Serial Bus (USB), Ethernet, Wi-Fi, Bluetooth, near-field communication (NFC), radio frequency identification (RFID), etc.

Figure 6A:
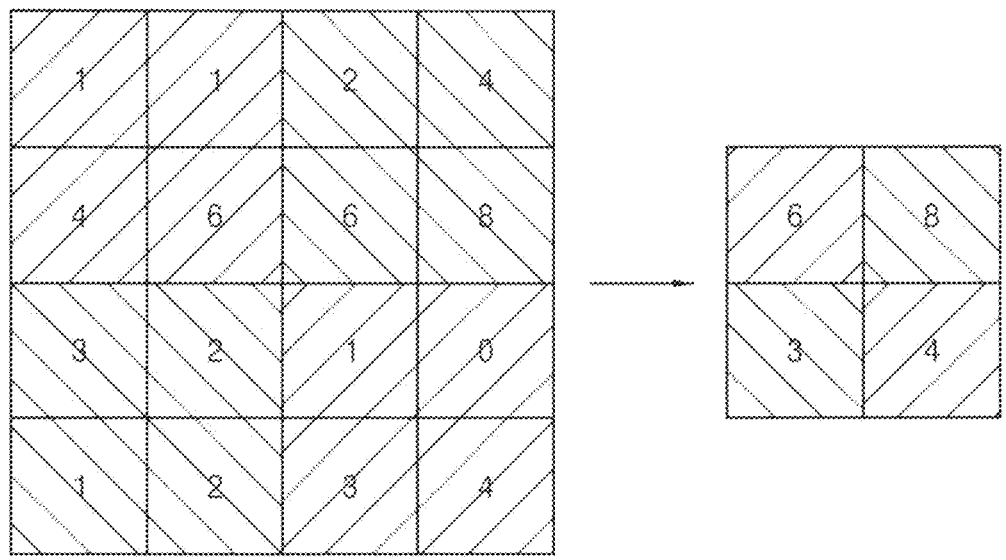
FIGS. 6A and 6B are diagrams for describing examples of a first layer in which an early-stop event is generated.
Figure 6B:
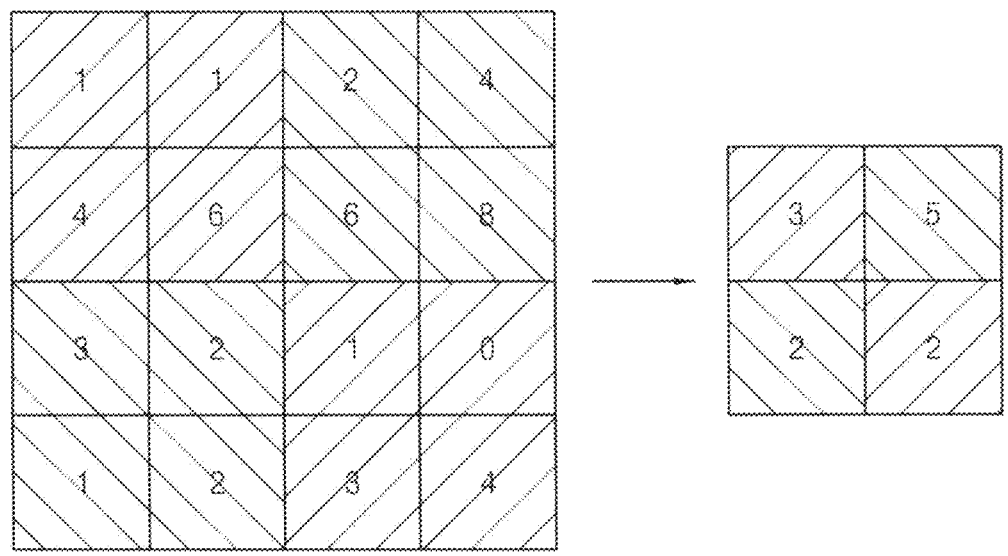

FIG. 5 is a flow chart illustrating the method of controlling the plurality of computing operations in the DNN in detail. FIGS. 6A and 6B are diagrams for describing examples of a first layer in which an early-stop event is generated.

Referring to FIGS. 4 and 5, in the method of controlling the plurality of computing operations in the DNN according to an example embodiment, the model parser 110 analyzes the network structure NSI of the DNN (step S100). Step S100 in FIG. 5 may be substantially the same as step S100 in FIG. 1.

The early-stopper 120 sets the hyper parameter HP based on the network structure NSI and an initial value of the real-time context information CI (e.g., initial context information) (step S200a). Step S200a in FIG. 5 may correspond to a portion of step S200 in FIG. 1.

The job assigner 130 generates the plurality of depth-wise commands DWJC based on an initial value of the hyper parameter HP (step S310). The plurality of depth-wise jobs are assigned to the plurality of resources 142, 143, 144, 145, 146 and 147 based on the plurality of depth-wise commands DWJC.

The plurality of resources 142, 143, 144, 145, 146 and 147 execute the plurality of depth-wise jobs. When all of the plurality of depth-wise jobs are not completed or finished and some of the plurality of depth-wise jobs are remained (step S320: NO), the remaining jobs are executed or stopped (or skipped) depending on whether an early-stop event is generated.

Particularly, when an early-stop event for the first layer is generated (step S410: YES), a subset of the computing operations for the at least one second layer are performed, and the remainder of the computing operations other than the subset of the computing operations for the at least one second layer are stopped. The at least one second layer is arranged prior to the first layer. In addition, at least one job associated with the some of the computing operations is checked to be completed such that the remaining jobs are executed based on a result of the some of the computing operations for the at least one second layer (step S420).

As described with reference to FIG. 1, the first layer may be a pooling layer. A position of data to be pooled or sampled (e.g., depth-wise) may be realized or recognized in advance (e.g., early), and then an early-stop signaling may be generated using the hyper parameter HP. The second layer may be a convolutional layer, but not limited thereto and changed one of various computing layers.

In some example embodiments, the first layer may be a maximum pooling layer. In this example, the first layer may select a maximum value among a plurality of characteristic values, and the plurality of characteristic values may be included in a predetermined region of first volume data that is input to the first layer.

For example, as illustrated in FIG. 6A, when a 2*2 maximum filter is applied to 4*4 data, 6 may be selected as a maximum value for an upper left 2*2 region. Similarly, 8 may be selected as a maximum value for an upper right 2*2 region, 3 may be selected as a maximum value for a lower left 2*2 region, and 4 may be selected as a maximum value for a lower right 2*2 region. As a result, the 4*4 data may be down-sampled to 2*2 data.

As described above, when the first layer is the pooling layer, one of the plurality of characteristic values is selected as the maximum value, and thus it is required to realize or recognize a position of the maximum value in advance (e.g., early). There are two schemes to determine the position of the maximum value in the second layer that is arranged prior to the first layer.

In a first scheme, before the plurality of depth-wise jobs are executed (e.g., before the DNN is actually driven), the position of the maximum value may be predetermined based on a training operation before the DNN is actually driven. For example, the position of the maximum value may be tracked during the training operation to store a probability of the position of the maximum value, and the position of the maximum value may be stored when the probability is greater than or equal to a predefined threshold probability. As another example, the position of the maximum value may be selected based on any criteria during the training operation.

In a second scheme, while the plurality of depth-wise jobs are executed (e.g., while the DNN is driven), the position of the maximum value may be determined by tracking the second layer in real-time or during runtime. The second scheme may be referred to as an inference scheme. For example, the position of the maximum value may be realized or recognized by tracking in real-time or during runtime after a depth-wise computing operation is performed for only a predetermined depth. After that, the depth-wise computing operation corresponding to the position of the maximum value may be performed for the total depth, and the depth-wise computing operation corresponding to the other positions may be stopped. In addition, when the position of the maximum value is maintained by a predetermined number of times, the depth-wise computing operation may be performed for the position of the maximum value, and the tracking process may not be performed.

For example, the maximum value may be selected by tracking X major characteristic values among the plurality of characteristic values, where X is a natural number. In other words, the number of candidates to be tracked for the maximum value may be greater than or equal to one and less than the number of inputs of the maximum filter (e.g., $1 \leq X < (\text{input}-1)$). For example, in an example of the 2*2 maximum filter, one, two or three maximum values may be selectively tracked.

In an example of tracking the position of the maximum value, the tracking process may be performed for only specific depths of the second layer. The second layer and/or second volume data that is input to the second layer may include first through N depths, where N is a natural number greater than or equal to two. For example, only K consecutive depths among the first through N depths may be computed, where K is a natural number greater than or equal to two and less than or equal to N. In other words, only I through (I+K−1)-th depths may be computed, where I is any natural number. As another example, only M depths among the first through N depths may be computed, where M is a natural number greater than or equal to two and less than or equal to N. Any two depths among the M depths may be arranged spaced apart from each other, and the M depths may be selected based on a predetermined interval, number of times or ratio. In other words, only odd-numbered depths or even-numbered depths may be computed, only any number of depths that are spaced apart from each other may be computed, or a minimum value may be kicked out whenever first, second and third quarters of the total layers are computed.

In some example embodiments, the first layer may be an average pooling layer. In this example, the first layer may obtain an average value of a plurality of characteristic values, and the plurality of characteristic values may be included in a predetermined region of first volume data that is input to the first layer.

For example, as illustrated in FIG. 6B, when a 2*2 average filter is applied to 4*4 data, 3 may be obtained as an average value for an upper left 2*2 region. Similarly, 5 may be obtained as an average value for an upper right 2*2 region, 2 may be obtained as an average value for a lower left 2*2 region, and 2 may be obtained as an average value for a lower right 2*2 region. As a result, the 4*4 data may be down-sampled to 2*2 data.

However, a scheme of obtaining the average value may not be limited to an example (e.g., based on mean values) illustrated in FIG. 6B. For example, the most approximate value to the average value may be selected as the average value, a median value or a center value may be selected as the average value, or other various schemes (e.g., computing flows or simply flows) for obtaining the average value may exist. For example, the average value may be obtained by selecting Y flows among a plurality of flows used for obtaining the average value, where Y is a natural number. The selected flows may be performed, and the unselected flows may be stopped. For example, some of flows may be selected based on various schemes in which, e.g., some of flows are randomly selected, some of flows without maximum and minimum values are selected, some of flows with similar values are selected, etc.

As with the process of tracking the position of the maximum value, the selected flows may be performed for only specific depths of the second layer.

In steps S410 and S420, all of variables that are used for performing the early-stop function may be set to the hyper parameter HP. For example, the positions, ranges and/or number (e.g., K or M) of specific depths to be computed, the number (e.g., X) of candidates to be tracked for selecting the maximum value, and/or the number (e.g., Y) of flows to be selected for obtaining the average value may be set by the hyper parameter HP.

In other words, the hyper parameter HP may be used as a fine tunable knob, and a trade-off between accuracy and cost (e.g., power/performance) may be adjusted using the hyper parameter HP. The DNN may be optimized based on requirements of application (e.g., accuracy and/or latency), capacity of hardware (e.g., each resource), context-awareness, etc.

Referring again to FIGS. 4 and 5, when not all of the plurality of depth-wise jobs are completed or finished and some of the plurality of depth-wise jobs remain incomplete (step S320: NO), and when the early-stop event for the first layer is not generated (step S410: NO), the remaining jobs of the plurality of depth-wise jobs are executed (step S330).

After steps S410 and S420 are already performed, e.g., after some of the computing operations for the second layer are performed and the remainder of the computing operations other than the already performed computing operations for the second layer are stopped, the job assigner 130 may assign the remaining jobs among the plurality of depth-wise jobs based on a result of the some of the computing operations for the second layer, and the remaining jobs among the plurality of depth-wise jobs may be continuously executed based on the result of the some of the some of the computing operations.

For example, when the second layer is a convolutional layer, pooled data (e.g., the maximum value) may be written into a predefined position, and other values may not be written or zero value may be written into other positions (e.g., zeroing). In addition, activation functions such as RELU, bias adding and pooling may be integrated or combined. For example, a bias adding layer that is arranged subsequent to the first and second layers may perform an adding operation for only a predefined pooling data position, and a maximum pooling layer that is arranged subsequent to the first and second layers may copy the predefined pooling data position into an output.

When all of the plurality of depth-wise jobs are completed or finished (step S320: YES), the context manager 150 may update the real-time context information CI based on the operating status of the system 100 (step S500), and the early-stopper 120 may update the hyper parameter HP in real-time or during runtime based on the updated real-time context information CI (step S600).

After that, when other depth-wise jobs are to be executed, the job assigner 130 may generate other depth-wise commands based on the updated hyper parameter HP (step S310), the other depth-wise jobs may be assigned to the plurality of resources 142, 143, 144, 145, 146 and 147 based on the other depth-wise commands, and the plurality of resources 142, 143, 144, 145, 146 and 147 execute the other depth-wise jobs.

Steps S310, S320 and S330 in FIG. 5 may correspond to step S300 in FIG. 1, and steps S410 and S420 in FIG. 5 may correspond to step S400 in FIG. 1.

Some possible scenarios based on the method of controlling the plurality of computing operations in the DNN according to example embodiments may be described as follows.

In some example embodiments, the DNN may include a first pooling layer. The first pooling layer may be a maximum pooling layer with a 4*4 maximum filter.

In an initial operation time of the DNN, an initial value (or a default value) of the hyper parameter HP may be set such that the number of candidates to be tracked for the maximum value is two and a range of depths to be tracked is about 70%. For example, some depths from a first depth to a depth corresponding to about 70% of the total depths are computed in a first convolutional layer that is arranged prior to the first pooling layer, and then two positions of two maximum values may be realized or recognized. Then, computing operations may be performed for the two positions of two maximum values, and computing operations corresponding to the other positions may be stopped.

While the DNN is driven based on the initial condition, the real-time context information CI may be collected such that a power level of battery for supplying power to the system 100 is relatively low and an accuracy of the computing operations is higher than that required by the system

100. Based on such real-time context information CI, the hyper parameter HP may be updated such that the number of candidates to be tracked for the maximum value is two and a range of depths to be tracked is about 30%.

In other example embodiments, the DNN may include a second pooling layer. The second pooling layer may be an average pooling layer with a 3*3 average filter.

In an initial operation time of the DNN, an initial value (or a default value) of the hyper parameter HP may be set such that the number of flows to be selected for obtaining the average value is five and a selection scheme is based on a median value. For example, when first through fifth flow among nine flows for obtaining the average value are computed in a second convolutional layer that is arranged prior to the second pooling layer, remaining four flows are stopped, and then five computed flows may be continuously executed based on the median value.

While the DNN is driven based on the initial condition, the real-time context information CI may be collected such that utilization of each resource is relatively low and a latency of the computing operations is relatively long. Based on such real-time context information CI, the hyper parameter HP may be updated such that the number of flows to be selected for obtaining the average value is seven and a selection scheme is based on three different values within about 3% difference.

In the method and system of controlling the plurality of computing operations in the DNN according to example embodiments, computing operations for a specific layer (e.g., a convolutional layer) arranged prior to a pooling layer may be stopped or skipped in advance, and thus the accuracy may be maintained, the total amount of the computing operations may be reduced, and various indicators (e.g., the performance, power consumption, memory footprint, memory bandwidth, etc.) related to the system may be enhanced. In addition, the early-stop function may be set using the hyper parameter, and reasonable target accuracy and latency may be set, and the trade-off between accuracy and cost may be adjusted based on the requirements of application, the capacity of hardware, the context-awareness, etc. Accordingly, the DNN may be optimized based on the method and system according to example embodiments.

In comparison with a conventional technique, the total amount of the computing operations may be reduced, the latency may be enhanced (e.g., reduced), and the accuracy may be maintained or enhanced based on the method and system according to example embodiments. All of computing operation for unused data of a layer arranged prior to the second layer may not be required, and thus the total amount of computing operations and the amount of memory reading may be reduced, e.g., by about quarter in a 2*2 maximum pooling layer. In addition, the effects of the method according to example embodiments may increase when the number of pooling layers increases and the method according to example embodiments is employed to each pooling layer.

FIG. 7 is a block diagram illustrating a system of controlling a plurality of computing operations in the DNN according to example embodiments.

Referring to FIG. 7, a system 100*a* of controlling a plurality of computing operations in the DNN includes a first model parser 110, a first early-stopper 120, a first job assigner 130 and a plurality of resources 142, 143, 144, 145, 146 and 147. The system 100*a* may further include a resource manager 141, a context manager 150, a second model parser 210, a second early-stopper 220 and a second job assigner 230.

The system 100*a* of FIG. 7 may be substantially the same as the system 100 of FIG. 4, except that the system 100*a* further includes the second model parser 210, the second early-stopper 220 and the second job assigner 230. The first model parser 110, the first early-stopper 120, the first job assigner 130, the plurality of resources 142, 143, 144, 145, 146 and 147, the resource manager 141 and the context manager 150 in FIG. 7 may be substantially the same as the model parser 110, the early-stopper 120, the job assigner 130, the plurality of resources 142, 143, 144, 145, 146 and 147, the resource manager 141 and the context manager 150 in FIG. 4, respectively.

The second model parser 210 may analyze the network structure NSI of the DNN. The second early-stopper 220 may set a hyper parameter HP' based on the network structure NSI and the real-time context information CI. The second job assigner 230 may generate a plurality of depth-wise commands DWJC' for the plurality of depth-wise jobs based on the hyper parameter HP'.

In some example embodiments, the second model parser 210, the second early-stopper 220 and the second job assigner 230 may be used in an initial operation time of the system 100*a*, and the first model parser 110, the first early-stopper 120 and the first job assigner 130 may be used while the DNN is driven. For example, the second model parser 210, the second early-stopper 220 and the second job assigner 230 may be used for setting an initial value of the hyper parameter HP', and the first model parser 110, the first early-stopper 120 and the first job assigner 130 may be used for updating the hyper parameter HP in real-time or during runtime.

In some example embodiments, the first model parser 110, the first early-stopper 120, the first job assigner 130, the plurality of resources 142, 143, 144, 145, 146 and 147, the resource manager 141 and the context manager 150 may be included in a first device 101, and the second model parser 210, the second early-stopper 220 and the second job assigner 230 may be included in a second device 201. The second device 201 may be physically separated from the first device 101.

In some example embodiments, at least a part of the model parsers 110 and 210, the early-stoppers 120 and 220, the job assigners 130 and 230, the resource manager 141 and the context manager 150 illustrated in FIGS. 4 and 7 may be implemented as hardware. For example, at least a part of the elements included in the systems 100 and 100*a* according to example embodiments may be included in a computer-based electronic system. In other example embodiments, at least a part of the model parsers 110 and 210, the early-stoppers 120 and 220, the job assigners 130 and 230, the resource manager 141 and the context manager 150 illustrated in FIGS. 4 and 7 may be implemented as instruction codes or program routines (e.g., a software program). For example, the instruction codes or the program routines may be executed by a computer-based electronic system, and may be stored in any storage device located inside or outside the computer-based electronic system.

As will be appreciated by those skilled in the art, the present disclosure may be embodied as a system, method, computer program product, and/or a computer program product embodied in one or more computer readable medium(s) having computer-readable program code embodied thereon. The computer readable program code may be provided to a processor of a general-purpose computer, special-purpose computer, or other programmable data processing apparatus. The computer-readable medium may be a computer-readable signal medium or a computer-readable storage medium. The computer readable storage medium may be any tangible medium that can contain, or store a program for use by or in connection with an instruction execution system, apparatus, or device. For example, the computer-readable medium may be a non-transitory computer-readable medium.

The present disclosure may be applied to various devices and systems that include the ANN and/or the DNN. For example, the present disclosure may be applied to systems such as a mobile phone, a smart phone, a tablet computer, a laptop computer, a PDA, a PMP, a digital camera, a portable gaming console, a wearable system, an IoT system, a VR system, an AR system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of controlling a plurality of computing operations in a deep neural network (DNN), the method comprising:
analyzing a network structure of the DNN, the network structure comprising a plurality of layers;
setting a hyper parameter, based on the network structure and real-time context information of a system configured to drive the DNN, the hyper parameter being used for performing an early-stop function;
assigning a plurality of depth-wise jobs to a plurality of resources included in the system based on the hyper parameter to execute the plurality of depth-wise jobs, each of the plurality of depth-wise jobs including at least a part of the plurality of computing operations; and
when an early-stop event for a first layer among the plurality of layers is generated based on the hyper parameter while the plurality of depth-wise jobs are executed:
determining a first subset of computing operations, among a plurality of computing operations for at least one second layer arranged at a prior stage than the first layer, and a second subset of computing operations, among the plurality of computing operations for the at least one second layer,
continuing execution of the first subset of computing operations after the early-stop event is generated, and
stopping execution of the second subset of computing operations after the early-stop event is generated,
wherein the first subset of computing operations corresponds to a first subset of nodes among a plurality of nodes in the at least one second layer, and
wherein the second subset of computing operations corresponds to a second subset of nodes among the plurality of nodes in the at least one second layer.

2. The method of claim 1, further comprising:
updating the real-time context information based on an operating status of the system; and
updating the hyper parameter based on the real-time context information.

3. The method of claim 1, wherein the first layer is a maximum pooling layer that selects a maximum value among a plurality of characteristic values, and
wherein the plurality of characteristic values are included in a predetermined region of first volume data that is input to the first layer.

4. The method of claim 3, wherein, before the plurality of depth-wise jobs are executed, a position of the maximum value is predetermined based on a training operation.

5. The method of claim 3, wherein, while the plurality of depth-wise jobs are executed, a position of the maximum value is determined by tracking the at least one second layer in real-time.

6. The method of claim 5, wherein second volume data that is input to the at least one second layer includes first through N depths, where N is a natural number greater than or equal to two, and
wherein only K consecutive depths among the first through N depths are computed, where K is a natural number greater than or equal to two and less than or equal to N.

7. The method of claim 6, wherein the at least one second layer is a convolutional layer that performs a convolutional operation on the second volume data.

8. The method of claim 5, wherein second volume data that is input to the at least one second layer includes first through N depths, where N is a natural number greater than or equal to two,
wherein only M depths among the first through N depths are computed, where M is a natural number greater than or equal to two and less than or equal to N, and
wherein any two depths among the M depths are arranged spaced apart from each other.

9. The method of claim 8, wherein the M depths are selected based on at least one of a predetermined interval, a predetermined number of times and a predetermined ratio.

10. The method of claim 3, wherein the maximum value is selected by tracking X characteristic values among the plurality of characteristic values, where X is a natural number.

11. The method of claim 1, wherein the first layer is an average pooling layer that obtains an average value of a plurality of characteristic values, and
wherein the plurality of characteristic values are included in a predetermined region of first volume data that is input to the first layer.

12. The method of claim 11, wherein the average value is obtained by selecting Y flows among a plurality of flows used for obtaining the average value, where Y is a natural number.

13. The method of claim 1, wherein, after the second subset of computing operations are performed and a remainder of the plurality of computing operations are stopped, remaining jobs among the plurality of depth-wise jobs are continuously executed based on a result of the first subset of computing operations.

14. The method of claim 1, wherein the real-time context information includes at least one of performance and utilization of the plurality of resources, accuracy of the plurality of depth-wise jobs and power status of the system.

15. The method of claim 1, wherein the plurality of resources include at least one of a central processing unit (CPU), a graphics processing unit (GPU), a digital signal processor (DSP), an image signal processor (ISP), dedicated hardware and a neural processing unit (NPU).

16. A system of controlling a plurality of computing operations in a deep neural network (DNN), the system comprising:
- a memory storing one or more instructions; and
- a processor configured to execute the one or more instructions to implement:
  - a first model parser configured to analyze a network structure of the DNN, the network structure comprising a plurality of layers;
  - a first early-stopper configured to set a hyper parameter based on the network structure and real-time context information of the system configured to drive the DNN, the hyper parameter being used for performing an early-stop function;
  - a first job assigner configured to assign a plurality of depth-wise jobs based on the hyper parameter, each of the plurality of depth-wise jobs including at least a part of the plurality of computing operations; and
  - a plurality of resources configured to execute the plurality of depth-wise jobs, wherein when an early-stop event for a first layer among the plurality of layers is generated based on the hyper parameter while the plurality of depth-wise jobs are executed, the plurality of resources being configured to:
    - determine a first subset of computing operations, among a plurality of computing operations for at least one second layer arranged at a prior stage than the first layer, and a second subset of computing operations, among the plurality of computing operations for the at least one second layer,
    - continue execution of the first subset of computing operations after the early-stop event is generated, and
    - stop execution of the second subset of computing operations after the early-stop event is generated,
  - wherein the first subset of computing operations corresponds to a first subset of nodes among a plurality of nodes in the at least one second layer, and
  - wherein the second subset of computing operations corresponds to a second subset of nodes among the plurality of nodes in the at least one second layer.

17. The system of claim 16, wherein the processor is further configured to execute the one or more instructions to implement:
- a context manager configured to update the real-time context information based on an operating status of the system, and
- wherein the first early-stopper is configured to update the hyper parameter based on the real-time context information.

18. The system of claim 16, wherein the processor is further configured to execute the one or more instructions to implement:
- a resource manager configured to generate resource status information that represents performance and utilization of the plurality of resources.

19. The system of claim 16, wherein the processor is further configured to execute the one or more instructions to implement:
- a second model parser configured to analyze the network structure;
- a second early-stopper configured to set the hyper parameter based on the network structure and the real-time context information; and
- a second job assigner configured to assign the plurality of depth-wise jobs based on the hyper parameter.

20. The system of claim 19, wherein the second model parser, the second early-stopper and the second job assigner are used for setting an initial value of the hyper parameter, and
- wherein the first model parser, the first early-stopper and the first job assigner are used for updating the hyper parameter in real-time.

* * * * *